(12) United States Patent
Caveney

(10) Patent No.: US 7,656,903 B2
(45) Date of Patent: *Feb. 2, 2010

(54) SYSTEM AND METHODS FOR DOCUMENTING NETWORKS WITH ELECTRONIC MODULES

(75) Inventor: Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 736 days.

This patent is subject to a terminal disclaimer.

(21) Appl. No.: 10/353,640

(22) Filed: Jan. 29, 2003

(65) Prior Publication Data

US 2003/0154273 A1    Aug. 14, 2003

Related U.S. Application Data

(60) Provisional application No. 60/352,826, filed on Jan. 30, 2002.

(51) Int. Cl.
*H04J 3/24* (2006.01)
(52) U.S. Cl. .................................................. 370/475
(58) Field of Classification Search ................. 709/224; 370/254, 236, 475, 354
See application file for complete search history.

(56) References Cited

U.S. PATENT DOCUMENTS

| | | |
|---|---|---|
| 3,052,842 A | 9/1962 | Frohman et al. |
| 3,573,789 A | 4/1971 | Sharp et al. |
| 3,573,792 A | 4/1971 | Reed et al. |

(Continued)

FOREIGN PATENT DOCUMENTS

EP    0297079    3/1992

(Continued)

OTHER PUBLICATIONS

"Finding the Missing Link," Cabling Installation & Maintenance, Jun./Jul. 2002.

(Continued)

*Primary Examiner*—Kwang B Yao
*Assistant Examiner*—Tung Q Tran
(74) *Attorney, Agent, or Firm*—Robert A. McCann; Zachary J. Smolinski; Christopher K. Marlow

(57) ABSTRACT

A documentation system for a network having a source device which is connected to a network path which is connected to a destination device, the documentation system comprising, a data port which includes an electronic module with an identification code on the network path, the destination device including an electronic module with an identification code, the source device having the capability to send query signals along the network path addressed to a data port and destination device corresponding to the network path, the electronic module corresponding to the data port responding to the query addressed to the data port by transmitting its identification code to the source device, and the electronic module of the destination device responding to the query addressed to the destination device by transmitting its identification code to the source device, and a processor and a switch in communication with the source device, the processor and switch for directing the source device to send the query signals, to interpret the responses, and to re-send the query signals if a collision occurs between responses.

12 Claims, 2 Drawing Sheets

U.S. PATENT DOCUMENTS

| | | |
|---|---|---|
| 3,914,561 A | 10/1975 | Schardt et al. |
| 4,018,997 A | 4/1977 | Hoover et al. |
| 4,072,827 A | 2/1978 | Oman |
| 4,096,359 A | 6/1978 | Barsellotti |
| 4,140,885 A | 2/1979 | Verhagen |
| 4,196,316 A | 4/1980 | McEowen et al. |
| 4,517,619 A | 5/1985 | Uekubo |
| 4,673,246 A | 6/1987 | Schembri |
| 4,773,867 A | 9/1988 | Keller et al. |
| 4,796,294 A | 1/1989 | Nakagawara |
| 4,869,566 A | 9/1989 | Juso et al. |
| 4,901,004 A | 2/1990 | King |
| 4,937,825 A | 6/1990 | Ballard et al. |
| 5,037,167 A | 8/1991 | Beaty |
| 5,107,532 A | 4/1992 | Hansen et al. |
| 5,111,408 A | 5/1992 | Amjadi |
| 5,145,380 A | 9/1992 | Holcomb et al. |
| 5,161,988 A | 11/1992 | Krupka |
| 5,170,327 A | 12/1992 | Burroughs |
| 5,185,860 A * | 2/1993 | Wu .................. 709/224 |
| 5,204,929 A | 4/1993 | Machall et al. |
| 5,222,164 A | 6/1993 | Bass, Sr. et al. |
| 5,226,120 A | 7/1993 | Brown et al. |
| 5,233,501 A | 8/1993 | Allen et al. |
| 5,265,187 A | 11/1993 | Morin et al. |
| 5,270,658 A | 12/1993 | Epstein |
| 5,305,405 A | 4/1994 | Emmons et al. |
| 5,353,367 A | 10/1994 | Czosnowski et al. |
| 5,394,503 A | 2/1995 | Dietz, Jr. et al. |
| 5,432,847 A | 7/1995 | Hill et al. |
| 5,483,467 A | 1/1996 | Krupka et al. |
| 5,487,666 A | 1/1996 | DiGiovanni |
| 5,521,902 A | 5/1996 | Ferguson |
| 5,532,603 A | 7/1996 | Bottman |
| 5,546,282 A | 8/1996 | Hill et al. |
| 5,550,755 A | 8/1996 | Martin et al. |
| 5,568,525 A * | 10/1996 | de Nijs et al. ............... 375/356 |
| 5,574,938 A * | 11/1996 | Bartow et al. ............... 709/235 |
| 5,583,874 A | 12/1996 | Smith et al. |
| 5,684,796 A | 11/1997 | Abidi et al. |
| 5,726,972 A | 3/1998 | Ferguson |
| 5,727,055 A | 3/1998 | Ivie et al. |
| 5,754,112 A | 5/1998 | Novak |
| 5,764,043 A | 6/1998 | Czosnowski et al. |
| 5,790,041 A | 8/1998 | Lee |
| 5,832,071 A | 11/1998 | Voelker |
| 5,847,557 A | 12/1998 | Fincher et al. |
| 5,854,824 A | 12/1998 | Bengal et al. |
| 5,870,626 A | 2/1999 | Lebeau |
| 5,876,240 A | 3/1999 | Derstine et al. |
| 5,878,030 A | 3/1999 | Norris |
| 5,892,756 A | 4/1999 | Murphy |
| 5,898,837 A | 4/1999 | Guttman et al. |
| 5,915,993 A | 6/1999 | Belopolsky et al. |
| 5,923,663 A | 7/1999 | Bontemps et al. |
| 5,944,535 A | 8/1999 | Bullivant et al. |
| 6,002,331 A | 12/1999 | Laor |
| 6,041,352 A | 3/2000 | Burdick et al. |
| 6,067,014 A | 5/2000 | Wilson |
| 6,078,113 A | 6/2000 | True et al. |
| 6,086,415 A | 7/2000 | Sanchez et al. |
| 6,094,261 A | 7/2000 | Contarino, Jr. |
| 6,175,865 B1 | 1/2001 | Dove et al. |
| 6,222,908 B1 | 4/2001 | Bartolutti et al. |
| 6,229,538 B1 | 5/2001 | McIntyre et al. |
| 6,234,830 B1 | 5/2001 | Ensz et al. |
| 6,243,510 B1 | 6/2001 | Rauch |
| 6,285,293 B1 | 9/2001 | German et al. |
| 6,301,340 B1 | 10/2001 | Sansom et al. |
| 6,330,307 B1 | 12/2001 | Bloch et al. |
| 6,350,148 B1 | 2/2002 | Bartolutti et al. |
| 6,377,987 B1 * | 4/2002 | Kracht .................. 709/220 |
| 6,381,283 B1 | 4/2002 | Bhardwaj et al. |
| 6,421,322 B1 | 7/2002 | Koziy et al. |
| 6,424,710 B1 | 7/2002 | Bartolutti et al. |
| 6,434,716 B1 | 8/2002 | Johnson et al. |
| 6,437,894 B1 | 8/2002 | Gilbert et al. |
| 6,453,014 B1 | 9/2002 | Jacobson et al. |
| 6,456,768 B1 | 9/2002 | Boncek et al. |
| 6,499,861 B1 | 12/2002 | German et al. |
| 6,522,737 B1 | 2/2003 | Bartolutti et al. |
| 6,561,827 B2 | 5/2003 | Frostrom et al. |
| 6,574,586 B1 | 6/2003 | David et al. |
| 6,577,243 B1 | 6/2003 | Dannenmann et al. |
| 6,601,097 B1 | 7/2003 | Cheston et al. |
| 6,626,697 B1 | 9/2003 | Martin et al. |
| 6,629,269 B1 | 9/2003 | Kahkoska |
| 6,684,179 B1 | 1/2004 | David |
| 6,688,910 B1 | 2/2004 | Macauley |
| 6,714,698 B2 | 3/2004 | Pfeiffer et al. |
| 6,725,177 B2 | 4/2004 | David et al. |
| 6,750,643 B2 | 6/2004 | Hwang et al. |
| 6,764,343 B2 | 7/2004 | Ferentz |
| 6,778,911 B2 | 8/2004 | Opsal et al. |
| 6,784,802 B1 | 8/2004 | Stanescu |
| 6,798,944 B2 | 9/2004 | Pfeiffer et al. |
| 6,802,735 B2 | 10/2004 | Pepe et al. |
| 6,823,063 B2 | 11/2004 | Mendoza |
| 6,857,897 B2 | 2/2005 | Conn |
| 6,871,156 B2 | 3/2005 | Wallace et al. |
| 6,880,020 B1 | 4/2005 | Rubinstein et al. |
| 6,898,368 B2 | 5/2005 | Columbo et al. |
| 6,992,491 B1 | 1/2006 | Lo et al. |
| 7,005,861 B1 | 2/2006 | Lo et al. |
| 7,027,704 B2 | 4/2006 | Frohlich et al. |
| 7,028,087 B2 * | 4/2006 | Caveney .................. 709/224 |
| 7,068,043 B1 | 6/2006 | Lo et al. |
| 7,068,044 B1 | 6/2006 | Lo et al. |
| 7,069,325 B1 * | 6/2006 | Lu et al. .................. 709/226 |
| 7,160,143 B2 | 1/2007 | David et al. |
| 7,207,846 B2 | 4/2007 | Caveney et al. |
| 7,234,944 B2 | 6/2007 | Nordin et al. |
| 2001/0033550 A1 | 10/2001 | Banwell et al. |
| 2002/0069277 A1 | 6/2002 | Caveney |
| 2002/0071394 A1 | 6/2002 | Koziy et al. |
| 2002/0090858 A1 | 7/2002 | Caveney |
| 2002/0116485 A1 | 8/2002 | Black et al. |
| 2002/0120773 A1 | 8/2002 | Caveney |
| 2003/0046390 A1 * | 3/2003 | Ball et al. .................. 709/224 |
| 2003/0061393 A1 | 3/2003 | Steegmans et al. |
| 2003/0097438 A1 * | 5/2003 | Bearden et al. ............. 709/224 |
| 2003/0112965 A1 | 6/2003 | McNamara et al. |
| 2003/0152087 A1 | 8/2003 | Shahoumian et al. |
| 2003/0154276 A1 * | 8/2003 | Caveney .................. 709/223 |
| 2003/0204356 A1 | 10/2003 | David et al. |
| 2004/0052471 A1 | 3/2004 | Colombo et al. |
| 2004/0065470 A1 | 4/2004 | Goodison et al. |
| 2004/0073597 A1 | 4/2004 | Caveney et al. |
| 2004/0077220 A1 | 4/2004 | Musolf et al. |
| 2004/0184584 A1 * | 9/2004 | McCalmont et al. .......... 379/45 |
| 2004/0213267 A1 * | 10/2004 | Nagao .................. 370/395.43 |
| 2004/0219827 A1 | 11/2004 | David et al. |
| 2005/0111491 A1 | 5/2005 | Caveney |
| 2005/0136729 A1 | 6/2005 | Redfield et al. |
| 2005/0141431 A1 | 6/2005 | Caveney et al. |
| 2005/0195584 A1 | 9/2005 | AbuGhazaleh et al. |
| 2005/0224585 A1 | 10/2005 | Durrant et al. |
| 2005/0231325 A1 | 10/2005 | Durrant et al. |
| 2005/0239339 A1 | 10/2005 | Pepe |
| 2005/0245127 A1 | 11/2005 | Nordin et al. |
| 2006/0047800 A1 | 3/2006 | Caveney et al. |
| 2006/0282529 A1 | 12/2006 | Nordin |
| 2007/0032124 A1 | 2/2007 | Nordin et al. |
| 2007/0117444 A1 | 5/2007 | Caveney et al. |

| | | | |
|---|---|---|---|
| 2007/0132503 | A1 | 6/2007 | Nordin |

FOREIGN PATENT DOCUMENTS

| | | |
|---|---|---|
| EP | 0739110 A2 | 10/1996 |
| EP | 0575100 | 4/1998 |
| EP | 1152569 A2 | 11/2001 |
| EP | 0745229 | 3/2003 |
| FR | 2680067 A1 | 8/1991 |
| GB | 2236398 A | 4/1991 |
| GB | 2347752 A | 9/2000 |
| JP | 676878 | 3/1994 |
| JP | 2002111665 | 4/2002 |
| JP | 2004349184 | 12/2004 |
| WO | 9926426 A1 | 5/1999 |
| WO | 0060475 A1 | 10/2000 |
| WO | WO 0155854 A1 | 8/2001 |
| WO | 02069565 A2 | 9/2002 |
| WO | WO 02/080311 A1 | 10/2002 |
| WO | 2004044599 | 5/2004 |
| WO | 2005072156 | 8/2005 |
| WO | 2006052686 A1 | 5/2006 |

OTHER PUBLICATIONS

"IntelliMAC—The New Intelligent Cable Management Solution by ITRACS&NORDX/CDT," Press Release 2003.

"RiT Technologies Ltd. SMART Cabling System," RiT Technologies Ltd., 2004.

"Ortronics Launches iTRACS—Ready Structured Cabling Solutions," News Release Mar. 7, 2003.

"The SYSTIMAX iPatch System—Intelligent yet simple patching . . . ", CommScope, Inc., 2004.

"White Paper—Intelligent Patching," David Wilson, Nov. 2002.

"PatchView for the Enterprise (PV4E) technical background/Networks for Business," Jun. 24-26, 2003.

"RiT Technologies Ltd. Go Patch-less," May 2000 Edition of Cabling Systems.

"Intelligent Cable Management Systems—Hot Topics—Trescray".

"Brand-Rex Network solutions Access racks Cat 5E6 cabling Uk".

"Molex Premise Networks/Western Europe-Real Time Patching System," Molex Prem. Networks, 2001.

"Product of the Week—Molex's Real Time Patching System".

"EC&M Taking Note of Patch Panel Technology," Mark McElroy, Jun. 1, 1998.

"Intelligent Patching SMARTPatch for the Enterprise (SP4E)".

U.S. Appl. No. 10/910,899, filed Aug. 3, 2004, Caveney, et al.

U.S. Appl. No. 10/969,863, filed Oct. 22, 2004, Caveney.

U.S. Appl. No. 10/997,600, filed Nov. 23, 2004, Caveney, et al.

Cisco "Catalyst Inline Power Patch Panel" Data Sheet; May 2000.

\* cited by examiner

SYSTEM AND METHODS FOR DOCUMENTING NETWORKS WITH ELECTRONIC MODULES

CROSS-REFERENCE TO RELATED APPLICATION

This application is claiming priority to the previously filed U.S. provisional patent application Ser. No. 60/352,826, filed Jan. 30, 2002, entitled "Network Documentation System With Electronic Modules," incorporated herein by reference in its entirety.

BACKGROUND OF THE INVENTION

As communication network utilization and technology continues to escalate, the typical local area network (LAN) is simultaneously growing larger and denser, and it is increasingly desirable and advantageous to continuously document the physical paths of network interconnections and the physical locations of network components, including network connectors or ports in such paths and destination devices, e.g., personal computers or telephones.

Such a documentation system provides many advantages, including facilitating the planning and revision processes, the determination of the location of the physical area of a discontinuity in the network path, and the determination of the physical locations of destination devices.

SUMMARY OF THE INVENTION

There is provided a documentation system for a network having a source device which is connected to at least one destination device through at least one intermediate network path element. The source device has the capability to transmit a query signal directed to any destination device to which it is connected and each destination device has the capability to send a response signal containing its identification code back to the source device. In addition, the source device has the capability to transmit a query signal directed to any intermediate network path element which has a physical location in a designated zone, and an electronic module in the intermediate network path element has the capability to return a response signal containing its identification code back to the source device. The source may be adapted to re-send a query signal if one or more response signals are not received.

The network documentation system utilizes software to direct the source device to sequentially send query signals directed to destination devices to which it is connected and to intermediate network path elements in each designated zone to which it is connected. The response signals are interpreted by the software to document the network configuration.

DETAILED DESCRIPTION OF THE ILLUSTRATED EMBODIMENT

Figure 1:
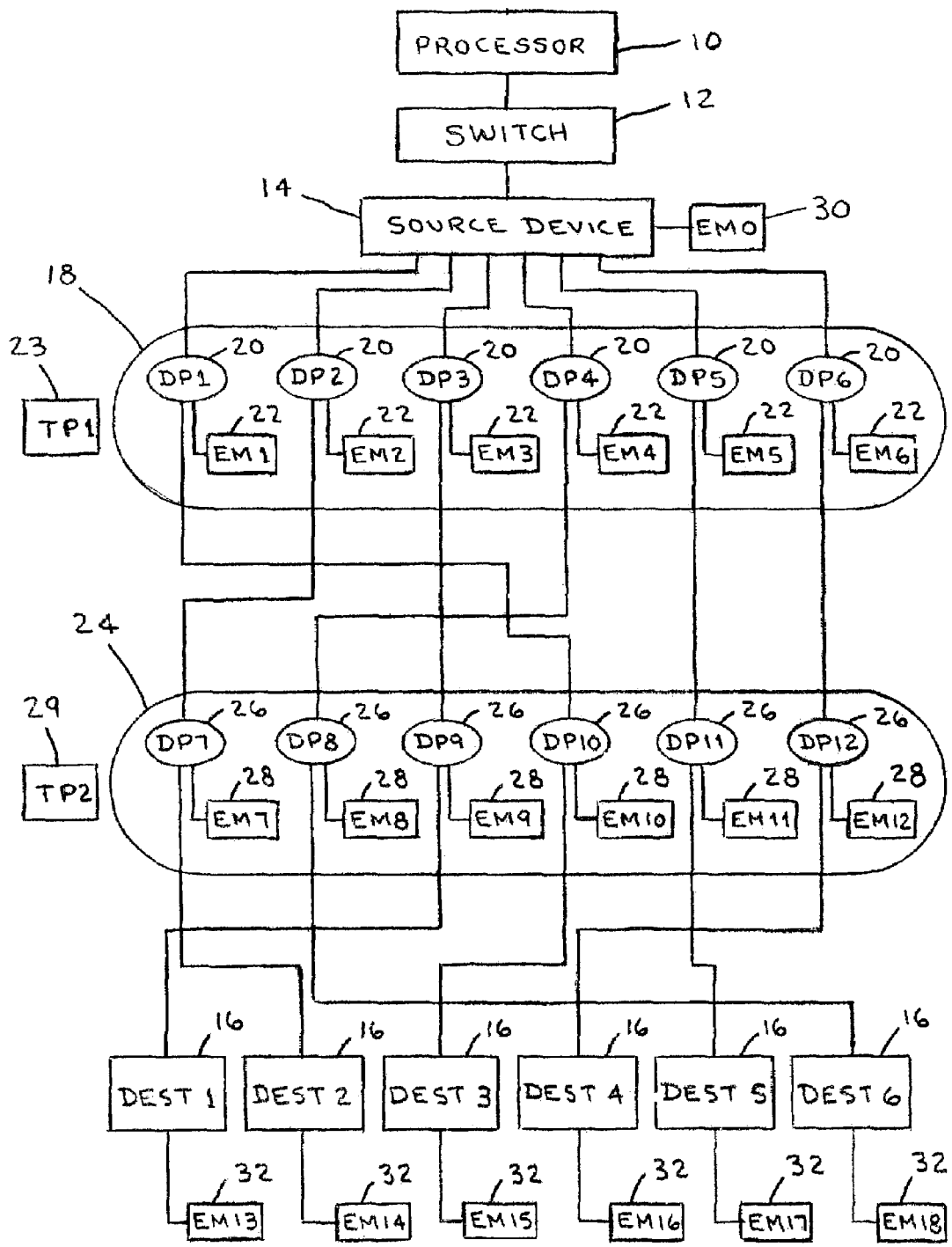
FIG. 1 is a schematic view of a documentation system in accordance with a first embodiment of the invention.

The invention is directed to apparatus and methods which automatically provide documentation of a network system, hereinafter called "the system." This description incorporates by reference in their entireties previously filed U.S. patent application Ser. No. 10/060,608, filed Jan. 30, 2002, entitled "Network Documentation System With Electronic Modules," along with prior filed applications Ser. No. 60/270,811, filed Feb. 23, 2001, and No. 60/297,289, filed Jun. 11, 2001, both entitled "Apparatus And Method For Efficient Network Reconfiguration" and incorporated by reference therein in their entireties.

To improve the accuracy, efficiency and capability of documenting a network system, electronic modules are placed into electronic communication networks with corresponding ports or nodes of the network such that connecting apparatus, connecting the respective ports or nodes to a source device, also provide a mechanism by which query and response signals may be routed between the source device and the connected ports or nodes in the system in the same manner that data signals may be transmitted between them. The signals may be transmitted over the same or a different medium from the data signals (e.g., common or separate wire or fiber). The electronic modules have associated identification elements that may have a single component or multiple components, and the modules are capable of receiving and recognizing query signals directed to them and responding by transmitting their identification code back to the source device. Thus, the system may utilize signals directed toward and received from all of the respective data ports or nodes in the system and thereby formulate a "map" of the entire system as it is physically configured.

In State of the Art documentation systems, such as the HP Openview System, and/or Element Management Systems, such as Cisco Works, a source device, i.e. a switch, sends a query signal through one designated network path that causes any destination device, i.e. a personal computer, that receives the query to transmit a response signal containing its identification code to the source device.

The inventive documentation and fault detection system contemplates the preferable use of electronic modules in every final destination device within a network, as well as in every network port which connects the source device to the final destination devices. Documentation systems and methods according to the present invention may be employed in Ethernet networks, including switched Ethernet networks. Each module can receive a query signal from a source, e.g., a switch, and ascertain whether the signal is directed to it by the use of identification codes. In a preferred embodiment of the invention, each electronic module which is in a designated physical location zone within the system has a unique zone address code. In some preferable embodiments of the invention, the ports and their corresponding modules may be stratified into "zones" based on their relative proximity, in an electrical or communications sense, to the source device and/or the final destination device. In these embodiments, since each signal ultimately travels only along one path given a particular network configuration, every port/module within a particular zone has the same zone addressing information, however each module retains a unique identification code which is transmitted to the source device in response to a query directed to it.

For example, a typical network may include a pair of patch panel ports for cross-connecting between a source and one or more destinations. In such an arrangement, the group of patch panel ports (and the electronic modules contained therein) closer to the source from a communications standpoint (i.e., the signal path direction) would be classified as zone 1. The next group of ports/modules along the signal path (i.e., the patch panel ports closer to the destination devices) would be classified as zone 2 in this example. The destination devices would be classified as zone 3.

The source sequentially sends a signal along respective output paths directed to any module along the path having a specified zone address. The one module in such zone along each respective path then, in turn, transmits back to the source when it receives the signal intended for its zone. The return signal includes the identification code of the module returning the signal. Using this procedure and information previously known to the documented system (e.g., the physical location of each port as identified by the unique identification codes thereof), the system can map (i.e. document) which ports and destination devices are connected along any particular signal path.

Each electronic module in the system would require a power supply which, in various embodiments of the invention, could be provided by a pair of conductors which could also be signal pairs or a battery. In a network system employing twisted wire pairs for carrying signals, the system could use one or more of the signal pairs to receive and transmit signals to and from particular electronic modules, including those associated with particular destination devices, sources, and network ports there between from a communications standpoint. A fiber optic or other LAN system could incorporate two conductors in each cable to be adapted for the same purpose.

As seen in FIG. 1, in a preferred embodiment of the invention, a computer or processor 10 is connected to a switch 12. At the direction of the processor, the switch may periodically or on-demand poll one or more of the data ports in the system to ascertain information about the ports. Alternatively or additionally, this polling may be accomplished using a software module provided on a computer or processor. Such polling may occur on a zone-by-zone basis, with the source device sequentially sending a signal, such as a query signal, along respective output lines directed to any electronic module along the path having the specified zone address. The identified module may then return its identification code back to the source. In this manner, the entire system may effectively be mapped (i.e., documented). The switch may preferably be in communication with a source device 14 and one or more destination devices 16.

A first zone 18 of data ports 20 may preferably be congregated on a single patch panel or network rack, and each of the data ports 20 is electrically connected directly with the source device 14. Each of the data ports 20, identified as "DP" in the figures, has an electronic module 22, identified as "EM" in the figures, in electrical communication therewith. Preferably, the first zone 18 of data ports includes a test port 23 disposed proximately thereto for permitting connection of a test plug. A second zone 24 of data ports 26 may also be congregated on another patch panel or network rack, and each of the data ports 26 is electrically connected directly with one of the destination devices 16. Each of the data ports 26 has an electronic module 28 in electrical communication therewith. Preferably, the second zone 24 of data ports includes a test port 29 disposed proximately thereto for permitting connection of a test plug. Additionally, the source device 14 preferably includes an electronic module 30 in electrical communication therewith and the destination devices 16 each include an electronic module 32 in electrical communication therewith. In FIG. 1, connective lines represent possible electrical connections that may be achieved by the use of patch cords and cables, and an exemplary system having six destination devices connected to a source device is shown.

Figure 2:
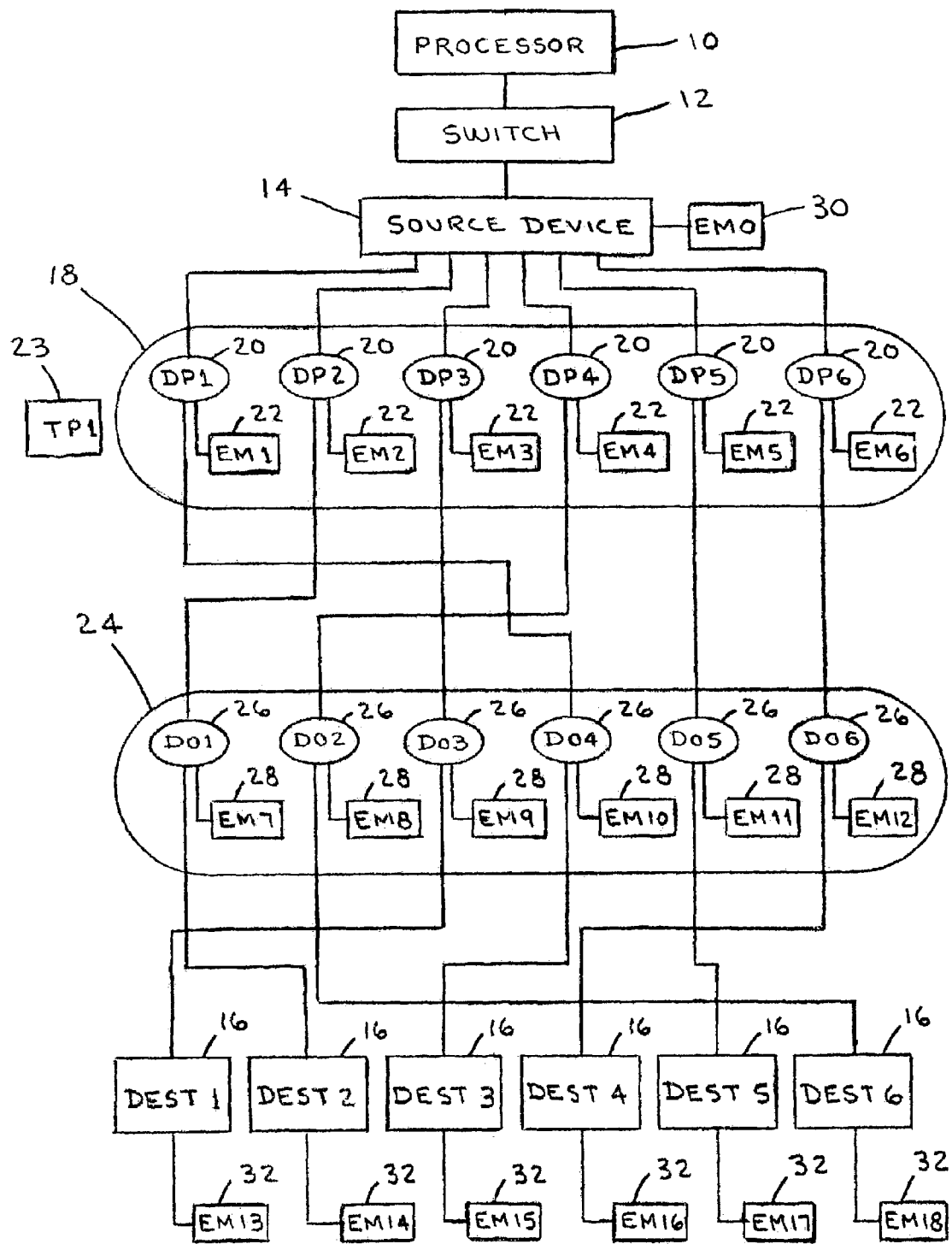
FIG. 2 is a schematic view of a documentation system in accordance with a second embodiment of the invention.

FIG. 2 illustrates an interconnect configuration wherein the first zone 18 is a patch panel and the second zone 24 are the outlet ports (e.g., wall outlet jacks) to which the destination devices are connected. According to one embodiment of the present invention, the destination devices may be provided with state of the art electronic modules with common address codes and unique identification codes.

The outlet ports are identified as "DO" in FIG. 2. The destination outlets, while not qualitatively different than the data ports 7-12 of FIG. 1, are disposed proximately to the destination devices 16 to which they are connected. This provides the benefit of knowing approximately where a particular destination device is physically located based on its proximity to a destination outlet which is fixed in the physical world. Thus, by focusing on the identification code of the electronic module of the particular destination outlet, rather than that of the destination device itself, the approximate location of the destination device may be ascertained by the system.

Among the many benefits of the invention is the ability to completely map out a particular network configuration. In status quo systems, when a source and destination are no longer in communication, it cannot generally be easily determined which link in the pathway that connects them is the problematic link. In the present invention, each intersection, i.e., LAN port, has associated with it an electronic module having a zone address code, and because response signals from a particular electronic module include the identification code of the module, pathways from a source to a destination can be more clearly identified on a link-by-link or zone-by-zone basis. Physical locations of ports and destination devices and revision instructions can be more efficiently determined for a particular reconfiguration.

In various embodiments of this invention, this same query signal also causes one or a plurality of ports which contain electronic modules along said network path to add its response containing its identification code as a suffix or a series of suffixes to the response from the destination device or the various responses could be received in any order.

In one embodiment, only the port to which the destination device is connected to is equipped with an electronic module. This electronic module responds to a query from the source device after a pre-set time delay which is long enough for the response from the destination device to have occurred. The source device therefore receives the response from the destination device followed by the response from said port.

In a similar embodiment, additional electronic modules are located in ports in specified zones in the network path between said port and the source device and each zone electronic module has a designated time delay to correspond to its designated zone. In this manner, the entire path between the switch and ultimate device can be documented.

In another embodiment, only the port to which the destination device is connected is equipped with an electronic module. Said electronic module receives the query followed by the response from the destination device or it receives only the response from the destination device and it sends its response containing its identification code.

In a similar embodiment, additional electronic modules are located in ports in specified zones in the network path. These electronic modules receive the query followed by the response from the destination device or they receive only the response from the destination device followed by the successive responses from each of said ports which are closer to the destination device along the network path than it is and it then sends its response containing its identification code.

In another embodiment, only the port to which the destination device is connected is equipped with an electronic module which responds immediately with its identification code when a query from the source device is received. Subsequently, the destination device responds to the source query with its identification code.

In another embodiment, only the port to which the destination device is connected is equipped with an electronic module which responds with its identification code after a query from the source device is received. The destination device responds to the same query with its identification code after it is received. The above two identification codes could be received in any order. If there is a collision of signals and both responses are not received by the source device, the query is repeated.

In a similar embodiment, only the port to which the destination device is connected is equipped with an electronic module which receives and stores the responses from the destination device. It then sends its total response which includes the response from the destination device plus its identification code.

In a similar embodiment, each electronic module receives and stores the responses from the destination device and the responses from all electronic modules for each said port which is closer to the destination device along the network path than it is. It then sends its total response which includes said stored responses followed by its individual response containing its identification code.

In another embodiment, the port to which the destination device is connected is equipped with an electronic module. In response to an inquiry from the source device, an electronic module in the destination device sends an inquiry to the electronic module in the port and it responds to the destination device with its identification code. The destination device then responds to the source device with its identification code followed by the port identification code.

An application of the above embodiments is a VoIP telephone wherein it is desirable to know the physical location of the telephone in the event an emergency 911 call is made from the telephone. While the physical location of the telephone can be changed, the physical location of the port to which it is connected is known if the port's identification code is known. Therefore, the physical location of an emergency call made with any telephone connected to a particular port is known by the identification code associated with said port. Associations between identification codes and specific ports may be recorded in a table or map containing physical locations along with identification codes of ports at the physical locations.

An advantage of these documentation systems is that they can be attained by adding said electronic modules and altering the software of said State of the Art documentation systems. The generation of any additional query signals to those generated by said State of the Art system is not required.

It should be noted that the above-described invention contemplates many embodiments not specifically described, and the explicitly described embodiments should be considered to be exemplary rather than definitional. As an example of an alternative not specifically described, without limitation or exclusion, the present invention may be employed in a network system having a distinct indicator, such as an LED, adjacent some or all of the LAN ports in the network. Such indicators may then be used to assist the revisor in identifying LAN ports requiring the insertion or removal of a cord plug.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A system for locating devices within a network having a source device which is connected to at least one network path having a destination device attached thereto, said system comprising:
   a port which includes an electronic module with an identification code on said at least one network path;
   said destination device including an electronic module with an identification code; said source device having the capability to send a query signal along said at least one network path addressed to said port and said destination device corresponding to said at least one network path;
   said electronic module corresponding to said port responding to said query addressed to said port by transmitting in a port transmission its identification code after a designated time delay to said source device;
   said electronic module of said destination device responding to said query addressed to said destination device by transmitting in a destination device transmission its identification code to said source device; and
   a processor, said processor in communication with said source device and adapted to associate said identification code of said port with said identification code of said destination device;
   wherein said source device is adapted to re-send said query signal if both said port transmission and said destination device transmission are not received at said source device.

2. The documentation system of claim 1 wherein said port is a patch panel port.

3. The documentation system of claim 1 wherein said port is an outlet port directly connected to said destination device.

4. The documentation system of claim 3 wherein said outlet port is a wall outlet jack.

5. A method for identifying and locating devices within a network, the method comprising:
   sending a query from a source device along a network path having a port in communication with said source device and a destination device connected to said port, said port having a port electronic module, said destination device having a destination device electronic module, each of said electronic modules having an identification code associated therewith;
   receiving said query at said port;
   responding to said query by sending, after a designated time delay, from said port to said source device a port response signal containing said identification code associated with said port electronic module;
   receiving said query at said destination device;
   responding to said query by sending from said destination device to said source device a destination device response signal containing said identification code associated with said destination device electronic module;
   monitoring said port response signal and said destination device response signal at said source device;
   associating said identification code of said destination device with said identification code of said port via a processor in communication with the source device; and
   re-sending said query from said source device along said network path if either of said port response signal or said destination device response signal is not received by said source device.

6. The method of claim 5 wherein said port is a patch panel port.

7. The method of claim 5 wherein said port is a wall outlet jack.

8. A network documentation system comprising:

a source device for sending a query signal;

a network path for carrying said query signal;

a port along said network path, said port comprising a port electronic module storing a port identification code associated with said port, said port electronic module adapted to respond after a designated time delay to said query signal by sending to said source device along said network path a port response signal comprising said port identification code;

a destination device in communication with said port, said destination device comprising a destination device electronic module storing a destination device identification code associated with said destination device, said destination device electronic module adapted to respond to said query signal by sending to said source device along said network path a destination device response signal comprising said destination device identification code; and a processor, said processor in communication with said source device and adapted to associate said identification code of said destination device with said identification code of said port;

wherein said source device is adapted to re-send said query signal if both said port transmission and said destination device transmission are not received at said source device.

9. The network documentation system of claim 8 wherein said port is located in a patch panel.

10. The network documentation system of claim 8 wherein said port is an outlet port connected to said destination device.

11. The network documentation system of claim 10 wherein said outlet port is a wall outlet jack.

12. The network management system of claim 8 wherein said destination device is a voice-over-internet-protocol phone.

* * * * *